United States Patent [19]
Stewart

[11] Patent Number: 5,803,017
[45] Date of Patent: Sep. 8, 1998

[54] ANIMAL LEASH

[76] Inventor: Wayne A. Stewart, 2518 SW. Genessee St., Seattle, Wash. 98106

[21] Appl. No.: 856,495

[22] Filed: May 14, 1997

[51] Int. Cl.⁶ ................................................. A01K 27/00
[52] U.S. Cl. ................................................. 119/799
[58] Field of Search ................... 119/771, 792, 119/795, 799

[56] References Cited

U.S. PATENT DOCUMENTS

| | | | |
|---|---|---|---|
| 54,729 | 5/1866 | Howe | 119/799 X |
| D. 362,519 | 9/1995 | Jacobsen et al. | D30/153 |
| D. 370,751 | 6/1996 | Hodgson | D30/153 |
| 408,309 | 8/1889 | Krick | 119/799 |
| 1,285,679 | 11/1918 | Glowacki | 43/18.1 |
| 1,595,275 | 8/1926 | White | 43/18.1 |
| 2,833,249 | 5/1958 | Cornman . | |
| 2,833,250 | 5/1958 | Beebe . | |
| 3,072,097 | 1/1963 | Morchand . | |
| 3,099,250 | 7/1963 | Soles, Jr. . | |
| 4,522,153 | 6/1985 | Vander Horst . | |
| 4,777,784 | 10/1988 | Ferguson | 119/792 X |
| 4,998,507 | 3/1991 | Browning | 119/799 |
| 5,213,063 | 5/1993 | Franck, III . | |
| 5,291,856 | 3/1994 | Goller | 119/795 |
| 5,375,561 | 12/1994 | Gundersen | 119/771 |

Primary Examiner—Robert P. Swiatek
Attorney, Agent, or Firm—Christensen O'Connor Johnson & Kindness PLLC

[57] ABSTRACT

An animal leash including a rod (14), a flexible cord (16) having a first and second end, wherein the first end is secured to the rod and the second end is spaced from the rod, and an attachment device (20) secured to the second end of the cord for releasable attachment of the cord to a restraint extending about an animal, is provided. The animal leash may further include a handle (12) and a looped strand (42) secured to the handle.

16 Claims, 1 Drawing Sheet

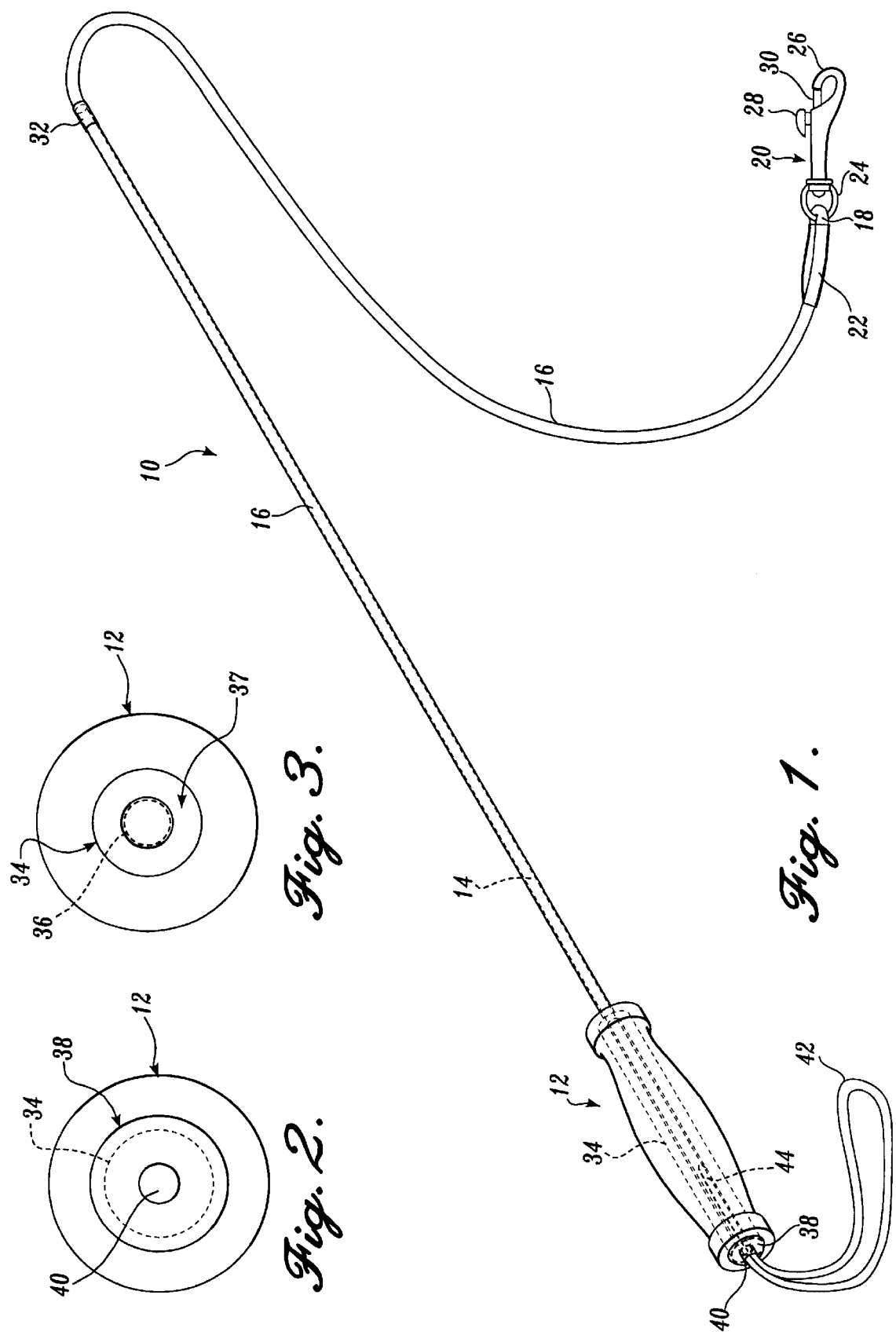

ANIMAL LEASH

FIELD OF THE INVENTION

The invention pertains to animal leashes, and more particularly to an animal leash which is less likely to become entangled with the animal or other objects.

BACKGROUND OF THE INVENTION

Animal handlers often desire to provide animals with opportunities to exercise in the outdoors. In many populated areas, however, rules and regulations do not permit animals to run freely. An animal restraint, such as a collar or harness that fits around the animal's neck or body, coupled to a leash held by the animal handler, provides the handler with sufficient control over the animal, yet allows the animal to exercise with a certain degree of freedom. Animal handlers also use a leash and animal restraint combination to train an animal to assume certain positions when moving or resting.

An animal leash is typically comprised of a flexible cord, such as a rope, with a latch on one end for connection to the animal restraint. The other end of the cord is held by the animal handler. A problem encountered with an animal leash of such design is that the cord, when slack, drops off from the handler's grip and runs near or along the ground before connecting to the animal's restraint. As the animal runs to and fro, it is not uncommon for the animal to step over the cord and get tangled up in the leash. When the leash becomes entangled in the legs of the animal, the leash interferes with the animal's freedom of movement. The animal handler is then inconvenienced in having to stop the animal and untangle the leash. Oftentimes, such a task is difficult, if not impossible, for persons of advanced age or persons with disabilities.

In other circumstances, if the animal runs in circles around the animal handler, the handler may get wound up in the leash. Similarly, the animal may run around objects such as road markers, fire hydrants, park benches, trees, etc., thus causing the leash to become caught up in these objects. Further, the animal may run through bushes, causing the leash to become entangled.

Moreover, when a leash is positioned near an animal's mouth, some animals have a tendency to chew on the leash, causing the leash to become damaged. Such damage, at a minimum, is not aesthetically pleasing, but further, may cause the leash to break apart and fail.

Yet another disadvantage of a typical rope leash is that the animal may have a degree of freedom to roam greater than that desired by the handler. An animal handler may desire to train the animal to walk or rest in certain positions. While using a simple rope as a leash, it is difficult for a handler to direct the animal to a particular position. One prior art solution, as exemplified by U.S. Pat. No. 4,522,153, replaces the rope with an extendible, telescoping rod. At one end of the control rod, a latch mechanism is provided for connecting the rod to an animal restraint. An animal handler holding the rod has a greater degree of control over the movement of the animal. However, such leash mechanism can be heavy for a handler to hold for a long time. Further, the animal's freedom of movement is largely eliminated.

Another prior art device disclosed in U.S. Pat. No. 5,213,063 provides a leash and tether mechanism which assists in preventing the leash from entangling with the animal or other objects. The mechanism disclosed, however, uses a pulley arrangement and tether line attached to permanent structures. It does not allow an animal handler to freely guide the animal over a large area.

U.S. Pat. No. 4,998,507 provides a leash assembly comprised of resilient, flexible segments linked together. U.S. Pat. No. 5,291,856 discloses a leash assembly with a stiffened section adjacent to the animal's restraint. Though these designs have a lower tendency of becoming entangled about the animal, the animal handler, nevertheless, does not have a high degree of control over the position of the animal.

Accordingly, the present invention provides an animal leash that overcomes these disadvantages by giving an animal handler a higher degree of control over the position of the animal, yet allows the animal to move about with a certain degree of freedom without becoming entangled in the leash.

SUMMARY OF THE INVENTION

The present invention is an animal leash which has an elongated, stiffening member, or rod, in an upper portion of the leash to be held by an animal handler, and a flexible cord in a lower portion of the leash to be attached to an animal restraint. A handle may be secured to the rod to provide the animal handler with a more comfortable grip. At the lower end of the leash, an attachment mechanism is provided for attaching the leash to an animal restraint. The attachment mechanism may be a hook and closure assembly wherein the closure is biased toward a closed position that, in conjunction with the hook, forms a closed loop. In one embodiment of the invention, the cord has a hollow channel defined axially through its length into which the rod is inserted. In a further embodiment of the invention, a portion of the cord-covered rod is inserted into a hollow core defined longitudinally through the length of a handle. A filler material may be provided in the hollow core to fill in the remaining space not occupied by the cord-covered rod. The filler material assists in securing the cord-covered rod within the handle.

Another aspect of the present invention is a wrist strap attached to the handle. The wrist strap may be a loop formed from a portion of the leash cord extending from an end of the handle, wherein the end of the cord is turned back and reinserted into the handle. A button on the end of the handle may be used to assist in securing the loop in place.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1 is a perspective view of an animal leash constructed in accordance with the principles of the present invention;

FIG. 2 is a bottom view of a handle without a wrist strap installed; and

FIG. 3 is a top view of a handle without a rod and cord assembly inserted therein.

DETAILED DESCRIPTION OF THE PREFERRED EMBODIMENT

Referring to FIG. 1, an animal leash 10 constructed in accordance with the present invention includes a handle 12, an elongated, stiffening member, or rod 14, and a cord 16. The rod 14 is secured to the handle 12 and the cord 16 is secured to the rod 14.

In the embodiment shown in FIG. 1, the handle 12 has a hollow core 34 defined longitudinally through the length of the handle 12. The rod 14 is inserted into and extends through the length of the hollow core 34.

According to one aspect of the invention, the cord 16 may be constructed with a hollow channel defined axially through a length of the cord. A suitable cord useable in the invention is a braided rope or cord made from a synthetic polymeric material such as nylon or polypropylene. The hollow channel of the cord 16 is sized to receive the rod 14. The rod 14 is inserted into and extends through at least a portion of the hollow channel of the cord 16. In the embodiment illustrated, the cord 16 envelops the entire length of the rod, including the portion of the rod inserted into the hollow core 34 of the handle 12. In this manner, the cord 16 is secured to the handle 12 as well as the rod 14. However, it is appreciated that the cord 16 may be secured to the rod 14 by other known means. For instance, the cord may be tied, adhesively attached, or clamped to the end of the rod. Alternatively, the cord may have a hollow channel which receives only a portion of the length of the rod.

Adhesives or mechanisms such as a clasp may be used to secure the rod within the cord.

The hollow core 34 of the handle 12 may be sized to receive the cord-covered rod in a snug fashion, thus securing the cord-covered rod to the handle. Alternatively, the hollow core 34 may be wider than the cross-section of the rod 14, as illustrated in FIGS. 1 and 3. In this preferred embodiment, a filler material 37 may be inserted into the hollow core 34 to fill the space not occupied by the cord-covered rod. (See FIG. 3 and related discussion below.) The filler material 37 is preferably a substance which acquires a rigid character after it is inserted into the hollow core 34. Filler material that is readily available includes plastics that are thermally or chemically set. The filler material 37 also secures the cord-covered rod to the handle. The handle 12 may be comprised of various materials including plastic, metal, or wood. Preferably, the handle is made of resilient material such as rubber or foam and is shaped to comfortably fit in the grip of an animal handler. The elongated, stiffening member, or rod 14, projects outward from an end of the handle 12. The rod may be completely rigid and constructed of, for example, a metal shaft. Preferably, the rod has a degree of flexibility. A flexible rod may be formed from various materials, such as an elastomeric or plastic material, or from fibrous materials such as wood or fiberglass. These materials are readily available in the form of a rod. The rod may be solid or have a hollow center. Preferably the rod is constructed of a resilient material with a memory such that the rod returns to its original shape after being flexed. While the length of the rod may be varied, a preferred length is approximately 32 inches.

According to the invention, the leash has a length of cord extending from the end of the rod 14. The length of the cord can vary but preferably measures approximately 39 inches from the end of the rod. In FIG. 1, a layer of material 32 is shown wrapped around the end of the rod to assist in securing the cord at the end of the rod. The material 32 is preferably a plastic tubing that is shrunk to tightly constrict around the cord at the end of the rod. To allow the animal leash 10 to be secured to an animal restraint (not shown), an attachment device 20 is secured to the cord 16. The attachment device illustrated is a latch secured to the cord by way of a loop 18 formed at the end of the cord coupled with a ring 24 connected to the attachment device. Preferably, the ring 24 is connected to the attachment device 20 with a swivel mechanism that permits the attachment device to rotate.

The attachment device 20 may simply be a hook that is attachable to an animal restraint. In the embodiment shown, the attachment device has a hook 26 and a closure 30. The closure 30 is moveable between an open and a closed position. Preferably, the closure 30 is biased toward the closed position. A biasing force may be provided by an integral spring mechanism (not shown). To assist in moving the closure 30 from a closed to an open position, a lever 28 connected to the closure 30, is provided. When in the closed position, the closure 30 and the hook 26 form a closed loop. In this manner, an animal restraint attached to the hook 26 does not easily detach without human intervention.

The loop 18 is formed by bending the end of the cord back on itself. An adhesive material is used to secure the cord in such a position. Further, a layer of material 22 is wrapped around the cord at the region where it doubles back on itself. The material 22 may be a plastic tubing similar to the material 32 that is shrunk to tightly constrict upon the cord. It is appreciated that other means of forming and maintaining the end of the cord in a loop may be used. For instance, if a braided cord is used, the end of the cord may be braided back into the braid of the cord. A clamp mechanism or adhesive material alone may also be used.

According to a further aspect of the invention, at an end of the handle 12, opposite of the end from which the rod extends, a strand formed into a loop 42 is provided and secured to the handle 12. Preferably, the loop 42 is sized to allow the hand of an animal handler to pass through it before grasping the handle 12, thus providing the handler with a wrist strap for added security in holding on to the leash.

In the embodiment illustrated in FIG. 1, the cord 16 covers the rod and extends through the length of the handle 12. The cord further extends from the end of the handle and is looped around back upon itself with the end of the cord being reinserted into the handle, as shown at reference numeral 44. In this fashion, the cord 16 is used to form the loop 42. To assist in securing the loop 42 to the handle 12, a button 38 fixed to the handle is provided. The button 38 has a hole 40 through which the cord extends and is reinserted.

FIG. 2 provides a bottom view of the handle 12 without the cord 16, rod 14, or loop 42 installed. As described earlier with respect to one embodiment of the invention, the handle 12 has a hollow core 34. In FIG. 2, the hollow core 34 is shown in phantom with a circular cross-section. A button 38 is shown with a hole 40 through which the cord 16 may pass to form a loop 42. The outer periphery of the button 38 preferably extends beyond the periphery of the hollow core 34.

FIG. 3 illustrates a top view of the handle 12 from which the cord 16 and rod 14 project when installed. As shown in FIG. 3, the handle 12 has a hollow core 34 wider than the cross-section of the space 36 occupied by the rod and cord, when inserted. As discussed earlier, a filler material 37 is inserted in the space within the hollow core 34 that is not occupied by the rod and cord.

While the preferred embodiment of the invention has been illustrated and described, it will be appreciated that various changes can be made therein without departing from the spirit and scope of the invention. For example, the cord 16 may be comprised of a variety of material, including, but not limited to, woven strands, linked chain, molded rubber, extruded plastic, etc. The button 38 could be eliminated and the loop 42 could be constructed of a strand separate from the cord 16. In view of these and other alterations, substitutions or modifications that could be made by one of ordinary skill in the art, it is intended that the scope of patent rights granted hereon be limited only by the appended claims.

The embodiments of the invention in which an exclusive property or privilege is claimed are defined as follows:

1. A leash for an animal comprising:

a handle having a hollow portion defined therein;

a cord having a hollow channel extending axially through a length of the cord;

a rod having a first end secured to the handle within the hollow portion of the handle, and a second end inserted into and extending through at least a portion of the hollow channel of the cord so that at least a portion of the rod is enveloped by the cord; and an attachment device secured to the cord for releasable attachment of the cord to a restraint extending about the animal.

2. The leash of claim 1, wherein at least a portion of the rod enveloped by the cord is inserted into the handle.

3. The leash of claim 2, wherein the cord envelops the first end of the rod and further extends through the length of the handle to protrude from an end of the handle.

4. The leash of claim 3, wherein the cord protruding from the end of the handle is further formed into a loop through which a human hand may pass.

5. An leash for an animal comprising:

a cord having a hollow channel extending axially through a length of the cord;

a rod inserted into and extending through at least a portion of the hollow channel of the cord;

a handle having a hollow core extending longitudinally through the length of the handle, wherein the rod and cord are inserted into the hollow core; and an attachment device secured to the cord for releasable attachment of the cord to a restraint extending about the animal.

6. The leash of claim 5, wherein the cord inserted into the hollow core of the handle protrudes from an end of the handle and forms a loop.

7. The leash of claim 6, wherein the loop is formed by bending the cord that protrudes from the end of the handle and inserting it back into the hollow core of the handle.

8. The leash of claim 7, the leash further comprising a button fixed to an end of the handle, wherein the cord that protrudes from the end of the handle protrudes through the button fixed to the end of the handle, forms a loop, and is inserted through the button back into the hollow core of the handle.

9. The leash of claim 5, wherein the handle is made of a resilient material.

10. The leash of claim 9, wherein the resilient material is foam.

11. The leash of claim 5, wherein the attachment device comprises a hook.

12. The leash of claim 11, wherein the attachment device further comprises a closure moveable between an open and a closed position, wherein when in the closed position, the closure and hook form a closed loop, and wherein the closure is biased toward the closed position.

13. The leash of claim 5, wherein the rod is constructed of a resilient, flexible material.

14. The leash of claim 5, wherein the hollow core further is filled with a material that acquires a rigid character.

15. A method of constructing an animal leash, comprising:

(a) providing a rod comprised of an elongated, stiffening member having a first end and a second end;

(b) securing a handle to the first end of the rod, the handle having a hollow portion in which the first end of the rod is inserted;

(c) providing a flexible cord having a first end and a second end and securing the first end of the cord to the second end of the rod, the second end of the cord being spaced from the second end of the rod; and (d) securing an attachment device to the second end of the cord for releasable attachment of the cord to a restraint extending about an animal.

16. The method of claim 15, further comprising inserting a filler material into the hollow portion of the handle to extend about the first end of the rod inside the hollow portion.

* * * * *